(12) United States Patent
Stählin

(10) Patent No.: US 8,606,221 B2
(45) Date of Patent: Dec. 10, 2013

(54) EMERGENCY CALL RECEIVING UNIT FOR TASK FORCES FOR EXPEDITING RESCUE OPERATIONS BY TRANSMITTING A LOCATING SIGNAL REPEATEDLY FROM A VEHICLE INVOLVED IN AN EMERGENCY

(75) Inventor: Ulrich Stählin, Eschborn (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 13/515,777

(22) PCT Filed: Dec. 14, 2010

(86) PCT No.: PCT/EP2010/069588
§ 371 (c)(1),
(2), (4) Date: Jun. 13, 2012

(87) PCT Pub. No.: WO2011/082985
PCT Pub. Date: Jul. 14, 2011

(65) Prior Publication Data
US 2012/0258683 A1    Oct. 11, 2012

(30) Foreign Application Priority Data

Dec. 14, 2009 (DE) .......................... 10 2009 058 074

(51) Int. Cl.
*H04M 11/04* (2006.01)

(52) U.S. Cl.
USPC ............. 455/404.2; 455/456.1; 455/418; 455/420; 455/456.2; 455/457; 455/41.2; 455/414.1; 455/419; 340/989; 340/990; 340/426.2; 340/426.22; 340/436; 340/438

(58) Field of Classification Search
USPC ............. 455/404.1–404.2, 414.1–414.2, 455/456.1–456.2; 340/988, 989, 993, 340/426.1, 426.2, 426.28, 426.16, 426.18, 340/426.22, 436, 438
See application file for complete search history.

(56) References Cited

U.S. PATENT DOCUMENTS 4,403,208 A * 9/1983 Hodgson et al. ............... 340/902
6,633,754 B1 * 10/2003 Raith .......................... 455/404.1
(Continued)

FOREIGN PATENT DOCUMENTS

DE    198 00 550 A1    11/1999
DE    198 82 330        4/2000
(Continued)

OTHER PUBLICATIONS

Rubinstein M G et al. "Measuring the capacity of in-car to in-car vehicular networks" IEEE Communications Magazine, IEEE Service Center, Piscataway, US Bd. 47, Nr. 11, Nov. 1, 2009, Seiten 128-136, XP011284164.

(Continued)

*Primary Examiner* — Vladimir Magloire
*Assistant Examiner* — Barbar Sarwar
(74) *Attorney, Agent, or Firm* — Cozen O'Connor

(57) ABSTRACT

An emergency call receiving unit for a vehicle. The emergency call receiving unit includes: a detection unit for detecting a trigger event of an accident-damaged vehicle; a control unit for generating a locating signal; a transmitting unit for repeated transmission of the locating signal to a receiver and the repeated transmission of the locating signal is triggered by a trigger event and the locating signal enables finding of the vehicle. A number of the rescue guideline of the respective vehicle and an RSSI for the rescue signal are received upon locating at least one vehicle involved in an accident depending on the reception field strength of the locating signal.

13 Claims, 1 Drawing Sheet

(56) References Cited

U.S. PATENT DOCUMENTS

| | | |
|---|---|---|
| 6,690,302 B1 * | 2/2004 | Inomata .................. 340/989 |
| 2006/0061483 A1 | 3/2006 | Smith et al. |
| 2009/0058685 A1 * | 3/2009 | Mc Call et al. .......... 340/995.24 |
| 2011/0177791 A1 | 7/2011 | Stählin et al. |

FOREIGN PATENT DOCUMENTS

| | | |
|---|---|---|
| DE | 198 82 330 T1 | 4/2000 |
| DE | 20 2004 005 817 U1 | 8/2005 |
| DE | 600 26 315 | 11/2006 |
| DE | 600 26 315 T2 | 11/2006 |
| DE | 10 2009 015 513 | 10/2009 |
| DE | 10 2009 015 513 A1 | 10/2009 |
| EP | 1 638 055 A2 | 3/2006 |

OTHER PUBLICATIONS

Marcelo Goncales Rubinstein et al.; Measuring the Capacity of In-Car to In-Car Vehicular Networks; Nov. 1, 2009; vol. 47, No. 11 pp. 128-136; ISSN: 0163-6804; XP011284164; US.

* cited by examiner

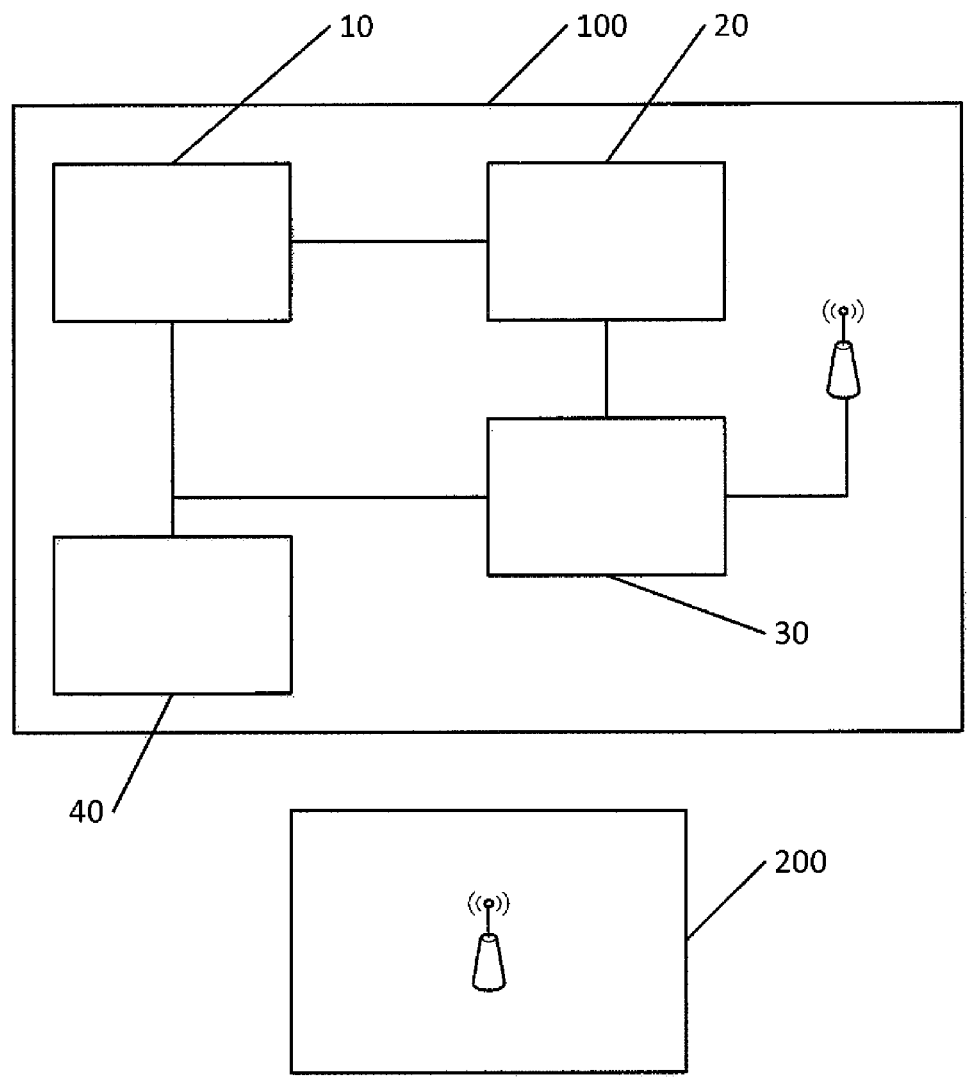

EMERGENCY CALL RECEIVING UNIT FOR TASK FORCES FOR EXPEDITING RESCUE OPERATIONS BY TRANSMITTING A LOCATING SIGNAL REPEATEDLY FROM A VEHICLE INVOLVED IN AN EMERGENCY

CROSS REFERENCE TO RELATED APPLICATIONS

This is a U.S. national stage of application No. PCT/EP2010/069588, filed on 14 Dec. 2010. Priority is claimed on German Application No. 10 2009 058 074.3, filed 14 Dec. 2009, the content of which is incorporated here by reference.

BACKGROUND OF THE INVENTION

1. Field of the Invention

The invention relates to an emergency call receiving unit for emergency services.

2. Description of Prior Art

Modern vehicles are frequently equipped with keyless access systems or radio keys, referred to as Remote Keyless Entry (RKE) systems. These radio keys control the locking and unlocking of doors and the baggage space of a motor vehicle by radio control. In this way, the vehicle door locks of a motor vehicle can be opened and closed in a wireless fashion. Further functions, such as, for example, the immobilizer, can be activated or deactivated by a radio key.

A radio key system comprises a vehicle-mounted receiver or a vehicle module and one or more mobile transmitters which can be held in the hand. The transmitter or the portable module can be provided here with one or more manually operated switches. Furthermore, there are newer generations of radio keys in which the radio key is no longer held in the hand but instead the vehicle-mounted transmitter registers the proximity of the key to the vehicle and unlocks the door lock as a result, for example, of the door handle being touched by the driver. The elimination of manual inputs by the radio key transmitter is made possible through the use of what is referred to as bidirectional communication. In contrast to a conventional radio key central locking system, the radio key transmitter not only transmits signals to the lock system but also receives information from the lock system. In this context, the radio key transmitter is embodied as a transceiver. With what is referred to as Passive Start and Entry (PASS) systems, the doors are unlocked solely as a result of the door handle being touched and the engine can be started by a button being pressed without a key.

In this context, the vehicle-mounted transceiver has a memory which stores an identification code which can identify the radio key transmitter.

The exchange of information with various vehicles participating in the traffic and between the vehicle and the infrastructure can in future contribute to increasing the safety of road users and the comfort of vehicle drivers. This communication from vehicle to vehicle or from vehicle to infrastructure, referred to below as vehicle-to-X communication (C2X communication) can be used only if a certain proportion of the vehicles or infrastructure units involved are equipped with corresponding communication units based on the same technology. In particular given the rapid changes in communication technology and in view of the price expectations of vehicle drivers, the additional expenditure which is associated with retrofitting the vehicles in order to provide and install such a communication unit may be too high. Therefore, simple and cost-effective possible solutions are needed which can make available vehicle-to-X communication to a large number of vehicle owners.

Furthermore it is known that emergency vehicles, such as fire trucks, ambulances, or the like, rely on well functioning communication when they are deployed. This requires communication technologies for vehicle-to-vehicle or vehicle-to-emergency service control center in order to be able to send massages to other emergency services and to be able to quickly coordinate the rescue operation.

If an emergency call is received at a rescue control center via, for example, a telephone call without a precise position indication, this rescue control centre will dispatch the emergency services. The position indication of the calling party is frequently not precise enough and the rescue services have to firstly locate in-situ the parties involved in the accident or an object which is being searched for. For example transmission equipment such as radio can be made available to the search parties for this purpose.

However, coordinating operations by radio involves in practice a certain degree of inaccuracy or does not function or does not function well enough. For this reason, there is a need for reliably functioning vehicle-to-vehicle communication for emergency services.

After a crash, it is sometimes difficult for rescue services to find the vehicle involved in the accident. Once it has been found, it is difficult with modern vehicles to find out where rescue cutters can be applied, due to such things as airbags and high strength steels, and which drive technology and therefore operating materials have to be taken into consideration.

It is known how vehicle functions can be triggered by rescue services and how search parties can be coordinated. Furthermore, a locating signal for emergency services is known.

SUMMARY OF THE INVENTION

An object of one embodiment of the invention is to permit a rescue operation for a driver of a vehicle involved in an accident to be speeded up and to allow the emergency services to carry out a rescue operation more quickly.

The described exemplary embodiments also relate to the emergency call receiving unit, the vehicle, the method, the program element and the computer-readable medium. Of course, for example the features specified below with respect to the emergency call receiving unit can also be implemented as method steps, program modules for the program element or in the computer-readable medium, and vice versa.

In a first advantageous embodiment, the emergency call receiving unit for a vehicle comprises a detection unit for detecting a vehicle involved in an accident and which generates a trigger event; a control unit for generating a locating signal; a transmitting unit for repeated transmission of the locating signal to a receiver and the repeated transmission of the locating signal is triggered by the trigger event, and the locating signal permits the vehicle to be found, wherein a number of the rescue guideline of the respective vehicle involved in an accident and an RSSI for the rescue signal are received as a function of the reception field strength of the locating signal when the at least one vehicle involved in an accident is found.

In this way, car-to-X applications can be made available via the radio key. Since radio key technology is already implemented in many vehicles, the communication from radio key to vehicle-to-X can be implemented very easily and very quickly. As a result, the development risk can also be reduced.

The position of a vehicle can be emitted cyclically by the vehicles, in combination with a time stamp and identification numbers, using the radio key. On this basis, the other vehicles, which also have this technology, can receive information about vehicles adjacent to them.

A further advantageous refinement is characterized by the fact that the transmitting unit is a radio key of the vehicle or a vehicle-mounted transceiver, and the received locating signal is recorded over a time interval.

In a further advantageous refinement, a position detection unit for detecting a position of the vehicle generates the locating signal based on the detected position.

A further advantageous refinement is characterized in that the emergency call receiving unit of the locating signal transmits at regular time intervals.

A further advantageous refinement is characterized in that the transmitting unit is designed to transmit the locating signal on the basis of the WLAN 802.11p Standard, WLAN 802.11a/b/g/n Standard, WiMax Standard, Bluetooth Standard, IEEE 802.15.4 Standard, ZigBee Standard or a cellular radio standard.

A particularly advantageous embodiment is characterized in that both an accident of the vehicle and an electronic emergency call (eCall), which has already been output by the vehicle, are evaluated as a trigger event by the emergency call receiving unit.

In a further advantageous refinement of the emergency call receiving unit, it is embodied such that it is suitable for receiving a search signal which is transmitted by the receiver, wherein the search signal is evaluated as a trigger event by the emergency call receiving unit.

A further advantageous refinement of the emergency call receiving unit is characterized in that the search signal is evaluated as a trigger event by the emergency call receiving unit only if an accident of the vehicle or the outputting of an electronic emergency call has previously been detected.

An emergency call receiving unit according to the invention is particularly advantageous in that the emergency call receiving unit is designed to carry out parallel transmission of the locating signal on a plurality of transmission paths.

A further advantageous refinement is characterized in that the control unit passes on the locating signal and other data to the transmitting unit for transmission.

A further advantageous embodiment is characterized in that the transmitting unit is designed to transmit the locating signal and further information to adjacent vehicles.

A further embodiment of the emergency call receiving unit is designed to receive a control signal transmitted by the receiver, and the received control signal is designed to control a function of a system component of the vehicle and being able to be activated by the emergency call receiving unit.

A further particularly advantageous embodiment of the emergency call receiving unit is characterized in that a communication signal received by the emergency call receiving unit and associated with a reported theft of the vehicle is evaluated as a trigger event by the emergency call receiving unit.

A vehicle which is equipped with the emergency call receiving unit according to the invention is particularly advantageous since rescue vehicles can always keep this emergency call receiving unit ready during operations.

After an accident, a vehicle transmits a locating signal. In order then to make it easier for the searching emergency services to find the vehicle, these emergency services use their receiver to request the car to switch on its horn, lights, front and rear headlights, turn indicators, passenger compartment lights, etc. In order to avoid misuse, this function is, however, only enabled by the vehicle if a locating signal has already been transmitted. Therefore, when an accident is detected the emergency call receiving unit provides access, via a mobile communication link, to the systems and components located in the vehicle. For this purpose, it is detected in the vehicle that the emergency call receiving unit is making contact with the vehicle involved in an accident and by means of secure identification information the emergency call receiving unit receives access to the vehicle components by the CAN bus or another communication connection. The identification information of the emergency call receiving unit is allocated via an authorized control center.

Driver assistance and vehicle safety systems can be addressed directly via the emergency call receiving unit given appropriate authorization. All the brake systems which are available in the vehicle and which have electronic control can be used as vehicle safety systems. Vehicle safety systems may be the electronic brake system (EBS), the engine management system (EMS), anti-lock brake system, traction control system, electronic stability program, electronic differential lock, transmission control unit (TCU), electronic braking force distribution system (EBFS) and/or engine drag torque controller (EDTC) as well as electrically actuable steering systems (ASF, EPS).

Driver assistance systems are electronic accessories in vehicles for assisting the driver in certain driving situations. They often focus on safety aspects but also on increasing driving comfort. These systems intervene semi-autonomously or autonomously in the drive, control (for example gas, brakes, steering) or signaling devices of the vehicle or warn the driver just before or during critical situations through suitable man/machine interfaces. Such driving assistance systems are, for example, parking aid (sensor arrays for detecting obstacles and distances) brake assistant (BAS), cruise control, adaptive cruise control (ACC), inter-vehicle distance warning system, turning assistant, traffic jam assistant, lane detection system, lane keeping assistant/lane assistant (lateral guidance assistant, lane departure warning (LDW) system) lane keeping support system, lane change assistance system, lane change support system, intelligent speed adaptation (ISA) system, adaptive cornering light, tire pressure monitoring system, driver state detection system, road sign detection system, platooning system, automatic emergency brake (ANB) system, high beam and low beam assistance system for headlamps, night vision system.

The invention proposes to activate single-use locating aids, such as for example rocket flares etc. in this way. However, to do this it must be ensured that these locating aids cannot be activated inadvertently and can only be activated when they do not constitute a hazard.

For example, emergency services can interrogate the status of the airbag via the emergency call receiving unit and, if appropriate, deactivate the airbags or in an emergency also trigger them in order to prevent hazards during rescue operations for the rescue personnel as a result of airbags which trigger in an uncontrolled fashion.

Likewise it is possible to interrogate the status of batteries and vehicle tanks. It is possible to determine whether said tanks are overflowing, if the filling level of the tank does not remain constant or whether there are short circuits with the bodywork, anywhere on the vehicle. Furthermore, the status of the batteries can be checked so that it can be determined whether the electrical and electronic systems in the vehicle are functional as a result of the supply of energy via the battery or have completely failed. Corresponding precautionary measures can subsequently be initiated by the rescue services.

In order to be able to use these functions, the present invention furthermore proposes equipping the rescue services with a particular design of an emergency call receiving unit in the form of what is referred to as a display key. This emergency call receiving unit in the form of a display key presents on its display the information for the rescuers, for example the number of the rescue guideline to be used, the reception field strength for the rescue signal, the received signal strength indication (RSSI) for the rescue signal, the color of the vehicle, the type of the vehicle or the number of passengers.

The display key is composed of a display which is integrated into an RKE input unit. The display is of an unpatterned, planar, two-dimensional sensor surface which is arranged on an electromechanical transducer, advantageously a vibration generator, and is permanently connected, for example bonded, thereto. The vibration generator has a plate that accommodates the sensor surface, as a result of which the frequencies and/or amplitudes generated by the vibration generator are transmitted to the sensor surface. The vibration generator is constructed in such a way that its plate can also carry out vertical movements.

The high-resolution input surface has dimensions which are suitable for a hand. The resolution is approximately 200× 200 or more sensor elements.

If a user touches the sensor surface with his hand, the location on the sensor surface at which contact took place is determined using the capacitively operating sensor surface.

The capacitively operating sensor surface is connected via an input/output unit to a microcontroller that evaluates the position signal of the sensor surface. For this purpose, the microcontroller has a data memory in which frequencies and/or amplitudes and changes in altitude are stored as a function of the coordinates of the sensor surface. This assignment of the frequencies and/or amplitudes and changes in altitude to the coordinate system corresponds to a current operator control function which is displayed visually to the user as a menu on a display device. This menu is made available by a superordinate information system of the RKE system, which information system is also connected to the microcontroller. The detected position is passed on from the microcontroller for controlling a complex operator control function to the information system of the RKE unit.

The microcontroller excites a vibration of the input surface in a coordinate-oriented fashion according to a virtual reference pattern which is configured as desired and positioned over the surface, in which pattern a frequency which corresponds to the position of the rescue personnel on the sensor surface is output by the microcontroller to the vibration generator by means of a D/A converter and an amplifier.

The input surface comprises three virtual control buttons that correspond to a displayed menu structure. The menu structure may correspond to the positions of the vehicles involved in an accident. These three control buttons are assigned to various frequencies in the memory of the microcontroller. If the user touches the parts of the input surface that correspond to the "navigation" function and stored as a first control button, the entire input surface vibrates with a frequency, and in an analogous fashion the entire input surface vibrates with the frequencies F2 and respectively F3 if the input surface is touched at the positions of the vehicles 2 and 3 involved in an accident. When the user passes his hand over the input surface he is therefore provided with a tactile impression of switches. It is to be noted once more that these three control buttons as representatives of the vehicles involved in an accident do not really exist on the input surface but rather only an impression of the existence is generated by the movement of the input surface. As a result, the blind operating capability of functions is assisted in an optimum fashion. The blind operating capability is a central precondition for operating information systems for the rescue services in order to keep the interaction with an information system of the RKE system as efficient as possible and also to provide a potential rescuer with a precisely targeted location indication for one or more vehicles involved in an accident in critical time situations.

It is crucial that the entire input surface respectively vibrates with the frequency corresponding to the position of the vehicles involved in an accident. The virtual reference pattern can be defined freely by means of software.

In order to generate an input command, a linear pressure sensor is arranged on the side of the plate of the vibration generator facing away from the sensor surface. However, a plurality of pressure sensors can also be distributed under the sensor surface.

If the rescue worker decides on a different menu surface, he presses an assigned sensor surface when the frequency F1 occurs and the pressure sensor transmits this information to the information system of the RKE system. On the basis of this input command, the information system changes the current operator control menu by displaying a different image on the display. Furthermore, the information system signals to the microcontroller that it is to make available from its memory the virtual reference pattern which corresponds to the new operator control task.

A diagram of an accident situation can be represented with significant points and vehicles involved in the accident, wherein the input surface vibrates with the first, second or third etc. frequency depending on the position when the position of the input element corresponds to one of the corresponding points.

This simple, software-controlled configuration makes it possible to manufacture a simple, in particular practical, emergency call receiving unit.

In particular for changing values, such as the reception field strength, there is provision for these to be plotted graphically over time. As a result, it becomes advantageously easier to locate the accident vehicle.

If a plurality of vehicles which are involved in the accident are located in the reception range, there is provision for a selection to be made, by the display key, of the vehicles whose information is to be displayed. In addition it is possible to include on the display how many additional vehicles involved in an accident are still located in the surroundings so that the rescue services can maintain an overview. The display key therefore functions as a real-time-capable digital map which makes available a situation analysis of the accident location with the involved vehicles. A plurality of "search keys" are ideally coupled for this purpose by means of radio signals so that it is possible to indicate if one of the accident vehicles is still not being searched for by anyone.

The emergency call receiving unit has an indicator of the reception field strength as a function of the received signal strength indication (RSSI). This indicator is used to find a signal which can be used for the communication. If the signal strength that is required for successful communication is undershot on the currently used channel, it is possible, if appropriate, to change to a better channel using the RSSI value.

If the vehicle has enabled functions such as, for example, "light on" or "horn", these functions are made available by push buttons of the key. Further possible functions for the push buttons are switching over what is being indicated, updating the indicated RSSI or the indicated reception field strength, signaling to other emergency services that the vehicle being searched for has been found in combination with the identifier of the vehicle so that it is apparent which vehicles have not yet been found, as well as interrogation of vehicle data.

Ideally, the display of the "search key" is equipped with background lighting and is watertight so that it can be used effectively even under poor visibility conditions and in bad weather. The push buttons are illuminated and are of such a size that they can be operated even with gloves.

The use of a special form of a key (RKE) allows synergies with the conventional vehicle key to be used and therefore the costs of retrofitting the emergency services can be kept low and no additional hardware is necessary for the described functionality.

BRIEF DESCRIPTION OF THE DRAWINGS

FIG. 1 is an emergency call receiving unit according to one embodiment of the invention.

DETAILED DESCRIPTION OF THE PREFERRED EMBODIMENTS

FIG. 1 is an emergency call receiving unit 100 for a vehicle. The emergency call receiving unit 100 includes a detection unit 10 for detecting if the vehicle is involved in an accident. In one embodiment, the accident generates a trigger event. A control unit 20 is provided that generates a locating signal. A transmitting unit 30 is configured for repeated transmission of the locating signal to a receiver 200, the repeated transmission of the locating signal being triggered by the trigger event. The locating signal permits the vehicle involved in the accident to be found. In one embodiment, the emergency call receiving unit 100 includes a position detection unit 40 for detecting a position of the vehicle. The locating signal generated by control unit 20 is based on the position detected by the position detection unit 40.

A vehicle leaves the road, turns over and comes to a stop in undergrowth. The emergency services are informed by eCall and arrive at the accident location. In addition, the vehicle transmits a locating signal. Since the rescue services cannot immediately find the vehicle, they activate the horn and light of the vehicle using the locating device. As a result the location of the vehicle in the undergrowth becomes apparent and the vehicle occupants can be rescued quickly.

A vehicle has been found by rescue services after an accident. The vehicle also transmits a locating signal. The emergency services interrogate via this communication link whether the airbags have been triggered and how the level of the tank is. In doing so they determine that the tank is slowly leaking and there is a risk of fire or explosion.

The fire department is called to an accident at an intersection. It is determined in-situ that the intersection is very large but that there is no accident there. Subsequently, the vehicles fan out in order to find the accident. After some time, vehicle 1 discovers the accident in a side street near to the intersection. Said vehicle then transmits a signal by wireless driving authorization which the other vehicles involved in the search receive and they subsequently also travel to the accident location. An emergency call is received on 911 at the rescue control center and the emergency services are dispatched. However, there is no accident at the communicated position. The emergency services then fan out and look for the accident. After some time, a search party finds a person in the woods at some distance from the original location. The search party transmits a signal by wireless driving authorization and additionally by cellular radio since not all the search parties are still in range of the wireless driving authorization. The signal contains the information that just one person has been found. The other search parties are informed through the message where the accident must approximately have happened and they then concentrate their search on the area around the location where the person was found.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or Method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An emergency call unit for a vehicle, comprising:
   a detection unit for detecting at least one vehicle involved in an accident that generates a trigger event;
   a control unit for generating a locating signal;
   a transmitting unit for repeated transmission of the locating signal to a receiver, the repeated transmission of the locating signal being triggered by the trigger event, wherein the locating signal permits the at least one accident involved vehicle to be found; and
   a display unit configured to display a display key, wherein the display key corresponds to at least two of a number of the rescue guideline to be used, a reception field strength of a rescue signal, a received signal strength indication (RSSI) for a rescue signal, a color of the vehicle, a type of the vehicle, and a number of passengers,
   wherein the number of the rescue guideline for guiding a rescue operation for the at least one accident involved vehicle and the RSSI for the rescue signal are received as a function of the reception field strength of the detection unit of the locating signal when the at least one accident involved vehicle is found.

2. The emergency call unit as claimed in claim 1, wherein the transmitting unit is one of a radio key of the vehicle and a vehicle-mounted transceiver and the locating signal is recorded over a time interval.

3. The emergency call unit as claimed in claim 1, further comprising:
   a position detection unit for detecting a position of the vehicle is present,
   wherein the locating signal is based on the detected position.

4. The emergency call unit as claimed in claim 1, wherein the locating signal is transmitted at regular time intervals.

5. The emergency call unit as claimed in claim 1, wherein the transmitting unit is configured to transmit the locating signal based on at least one of WLAN 802.11p Standard, WLAN 802.11a/b/g/n Standard, WiMax Standard, Bluetooth Standard, IEEE 802.15.4 Standard, ZigBee Standard and a cellular radio standard.

6. The emergency call unit as claimed in claim 1, wherein at least one of an accident of the vehicle and an electronic emergency call, which has already been output by the vehicle, are evaluated as the trigger event by the emergency call receiving unit.

7. The emergency call unit as claimed in claim 1, wherein the emergency call receiving unit is configured to receive a search signal transmitted by the receiver, wherein the search signal is evaluated as the trigger event.

8. The emergency call unit as claimed in claim 7, wherein the search signal is evaluated as the trigger event by the emergency call receiving unit only if the one of an accident of the vehicle or an outputting of an electronic emergency call has been detected.

9. The emergency call unit as claimed in claim 1, wherein the emergency call receiving unit is carries out parallel transmission of the locating signal on a plurality of transmission paths.

10. The emergency call unit as claimed in claim 1, wherein the control unit passes on the locating signal and other data to the transmitting unit for transmission.

11. The emergency call unit as claimed in claim 1, wherein the transmitting unit is designed to transmit the locating signal and further information to adjacent vehicles.

12. The emergency call unit as claimed claim 1, wherein the emergency call receiving unit is configured for receiving a control signal transmitted by the receiver, and the received control signal controls a function of a system component of the vehicle to be activated by the emergency call receiving unit.

13. The emergency call unit as claimed in claim 1, wherein a communication signal received by the emergency call receiving unit that is associated with a reported theft of the vehicle is the trigger event of the emergency call receiving unit.

* * * * *